United States Patent

Andvig

[15] 3,642,383
[45] Feb. 15, 1972

[54] ARRANGEMENT FOR HOLDING TOGETHER A TURBINE ROTOR AND OTHER ALIGNED MEMBERS OF A GAS TURBINE

[72] Inventor: Tore Anton Andvig, Kongsberg, Norway
[73] Assignee: A/S Kongsberg Vapenfabrikk, Kongsberg, Norway
[22] Filed: Nov. 25, 1969
[21] Appl. No.: 879,817

[30] Foreign Application Priority Data

Nov. 25, 1968 Norway ..................................4691/68

[52] U.S. Cl. ..............................................416/183, 416/244
[51] Int. Cl. .........................................F01d 5/04, F01d 5/06
[58] Field of Search..................416/204, 237, 198, 182–188, 416/95, 244; 415/177

[56] References Cited

UNITED STATES PATENTS

| | | | |
|---|---|---|---|
| 2,308,233 | 1/1943 | Schutte | 415/177 |
| 2,577,134 | 12/1951 | Land | 416/244 |
| 2,843,311 | 7/1958 | Buchi | 416/244 X |
| 2,938,659 | 5/1960 | Judson et al. | 415/177 X |
| 3,305,166 | 2/1967 | Castle | 416/237 X |
| 3,424,433 | 1/1969 | Langshur | 416/237 |

FOREIGN PATENTS OR APPLICATIONS

| | | | |
|---|---|---|---|
| 248,083 | 1/1948 | Switzerland | 416/244 |
| 269,605 | 10/1950 | Switzerland | 416/244 |

*Primary Examiner*—Everette A. Powell, Jr.
*Attorney*—Holman & Stern

[57] ABSTRACT

The invention comprises an improved design of a radial gas turbine assembly that is held together by a bolt secured to the turbine rotor and extending through a bore in members aligned with the rotor, the bolt having no centering contact with the walls of the bore, at least in the portion adjacent the turbine rotor. The connection between the bolt and the turbine rotor comprises a hollow sleeve of a heat resistant material that is a relatively poor conductor of heat, said sleeve having a clearance with respect to the bore in the order of 0.05 mm. The sleeve is connected to the bolt and to a pin protruding from the turbine rotor in such a way that the ends of the pin and the bolt respectively are kept a substantial distance apart.

3 Claims, 1 Drawing Figure

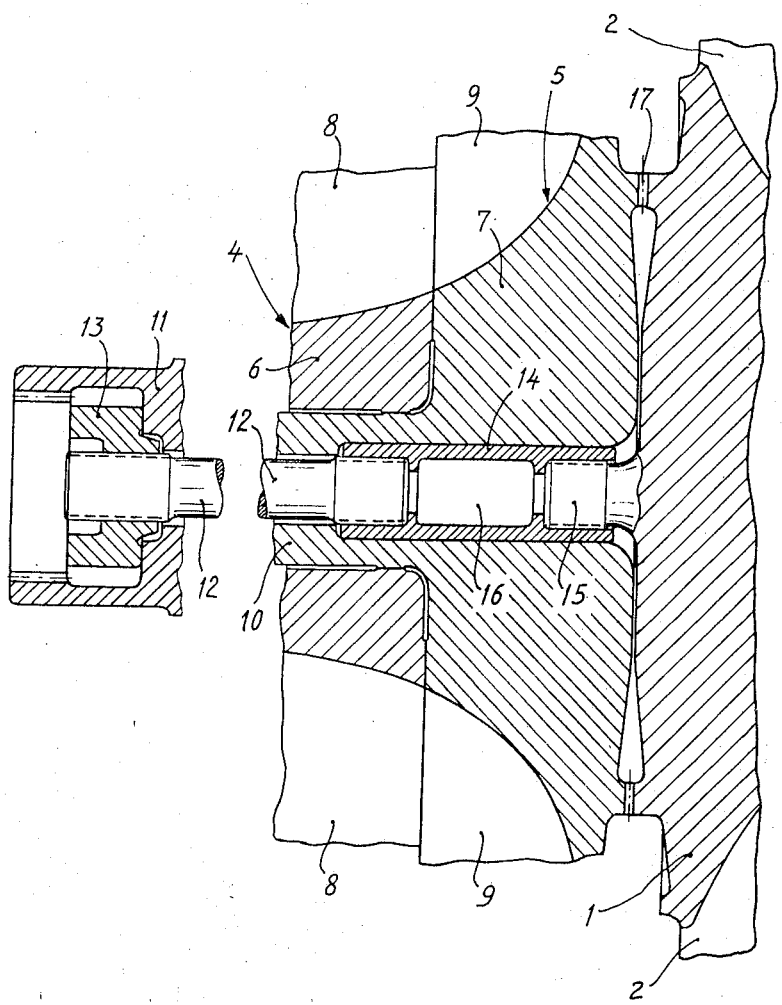

ARRANGEMENT FOR HOLDING TOGETHER A TURBINE ROTOR AND OTHER ALIGNED MEMBERS OF A GAS TURBINE

BACKGROUND OF THE INVENTION

The present invention relates to an arrangement for holding together a turbine rotor and other aligned members of a gas turbine by means of an elongated connecting element secured to the rotor, extending coaxially with said members through a bore therein and forcing the members axially together, the turbine rotor and the adjacent member being centered with respect to each other by means other than the connecting element.

Since the connecting element, which may for instance consist of a bolt, is secured to the turbine rotor, which is in contact with the hot gases, and since, due to the fact that the turbine rotor and the adjacent member are centered with respect to each other by other means, the bolt must have a clearance with respect to the bore in the adjacent member, heat from the turbine rotor will be conducted through the bolt, which is therefore strongly heated. This heating of course causes an axial expansion of the bolt and thereby a reduction in the clamping force between the members.

SUMMARY OF THE INVENTION

The object of the invention is to provide a connecting arrangement as indicated, in which the heat from the turbine rotor is to a substantial extent prevented from being conducted through the bolt-shaped connecting element, whereby the disadvantages connected with the heating of the bolt are eliminated.

This is achieved due to the fact that the connection between the connecting element and the rotor comprises a portion having a heat-insulating core and a very small clearance with respect to the bore in the said adjacent member and also a length that is so proportioned to the clearance that a substantial part of the heat supplied from the turbine rotor is transferred to the said adjacent member.

A heat-insulating core may be provided for instance by shaping the said portion as a separate sleeve with a hollow core. The clearance between the sleeve and the bore may for instance be 0.05 mm., and the length of the heat-insulating core portion may be of the same magnitude as the diameter of this portion. In this manner the heat conducted from the turbine rotor will be forced towards the walls of the bore in the said adjacent member, which may for instance be a compressor rotor, whereby a substantial part of the heat will be directed to the hub of the compressor rotor instead of being carried off through the connecting element.

The insulating connecting sleeve may advantageously be made of a heat resistant material that is a relatively poor conductor of heat, such as Nimonic 90, which is also the preferred material for the turbine rotor.

The sleeve may, for instance by screw threads, be connected at one end to a pin protruding from the turbine rotor and at the other end to the connecting element, which is in the form of a bolt. The ends of the pin and the connecting bolt must then of course be located a substantial distance apart in order to leave a heat-insulating core in accordance with the invention.

DESCRIPTION OF THE PREFERRED EMBODIMENT

An embodiment of the invention will now be described in more detail, reference being had to the accompanying drawing, which is a section of an axial sectional view of a radial gas turbine.

In the drawing, 1 is a radial turbine rotor having blades 2 and propelled by the hot gases from a combustion chamber. A compressor rotor consisting of two parts 4 and 5, each having a hub 6 and 7, respectively, and blades 8 and 9, respectively, is positioned coaxially with and adjacent the turbine rotor 1. The hub 7 of one part of the compressor rotor is provided with a shaft portion 10 which in a manner not illustrated is operatively connected to a coupling end 11 which may be coupled to a shaft of a reduction gear. The turbine rotor 1, the two parts 4 and 5 of the compressor rotor, an intermediate bearing sleeve not illustrated, and the coupling member 11 are held together into a stack by means of a longitudinal bolt 12 secured to the turbine rotor 1 and a nut 13. The connecting bolt 12 extends through a central bore in the coupling member 11, the shaft portion 10 and the hub 7.

The connecting bolt 12 is secured to the turbine rotor 1 through a sleeve 14. The connecting bolt 12 threadedly engages one end of the sleeve 14, which at the other end threadedly engages a pin 15 on the turbine rotor 1. The end faces of the connecting bolt 12 and the threaded pin 15 are spaced by a substantial distance so that in the connection between the bolt 12 and the rotor 1 there is provided a heat insulating core in the form of a cavity 16.

The compressor rotor and the turbine rotor 1 are connected to each other in a force-transmitting relationship by means of a known tooth coupling 17, which is designed so as to effect also a centering of the rotors with respect to each other. The rotors are forced together by tensioning the bolt 12. Since, as stated, the tooth coupling 17 centers the rotors on each other, the sleeve 14 must have a clearance with respect to the bore in the hub 7. However, according to the invention great importance is attached to making this clearance as small as possible, for instance in the order of 0.05 mm, which requires a careful working of the bore as well as the sleeve with small tolerances and correspondingly high costs. However, together with a suitable length of the cavity 16, such a clearance will cause a substantial part of the heat conducted from the rotor 1 through the pin 15 and into the sleeve 14 to pass into the hub 7 instead of entering the bolt 12. By a given length of the cavity 16 this effect is enhanced if a material that is a poor conductor of heat is used for the sleeve 14. At the same time the material of the sleeve 14 must be heat resistant. A material meeting these requirements is for instance Nimonic 90, which can also be used for the rotor 1.

I claim:

1. A turbine rotor assembly comprising a turbine rotor and a compressor rotor connected in a force-transmitting relationship; said compressor rotor comprising a hub having a shaft portion, said hub and shaft portion having an axial bore therethrough; a coupling member operatively connected to said shaft portion and coaxial therewith; sleeve means within said bore and coaxial therewith, said sleeve means being heat resistant and a poor conductor of heat, and having a heat-insulating cavity therein; said turbine rotor having a pin thereon fixedly secured to one end of said sleeve means and coaxial therewith; and a longitudinal connecting element fixedly secured at one end to said coupling member and at the other end to the other end of said sleeve means, and coaxial therewith; said sleeve means having a close tolerance with respect to said bore.

2. A turbine rotor assembly according to claim 1 wherein said pin and said connecting element are threadedly secured to said sleeve means, and are separated from each other by said cavity.

3. A turbine rotor assembly according to claim 1 wherein said cavity is of a length which, in proportion to said tolerance, causes transfer to said hub of a substantial portion of the heat supplied to the sleeve from the turbine rotor.

* * * * *